United States Patent
Björkman et al.

(10) Patent No.: US 8,690,444 B2
(45) Date of Patent: Apr. 8, 2014

(54) CRANKSHAFT BEARING ARRANGEMENT OF A COMBUSTION ENGINE

(75) Inventors: Peter Björkman, Nässjö (SE); Mats Granstedt, Huskvarna (SE)

(73) Assignee: Husqvarna Aktiebolag, Huskvarna (SE)

( * ) Notice: Subject to any disclaimer, the term of this patent is extended or adjusted under 35 U.S.C. 154(b) by 48 days.

(21) Appl. No.: 12/517,792

(22) PCT Filed: Dec. 6, 2006

(86) PCT No.: PCT/SE2006/001386
§ 371 (c)(1),
(2), (4) Date: Oct. 5, 2009

(87) PCT Pub. No.: WO2008/069703
PCT Pub. Date: Jun. 12, 2008

(65) Prior Publication Data
US 2010/0050979 A1 Mar. 4, 2010

(51) Int. Cl.
*F16C 33/76* (2006.01)
*F16J 15/32* (2006.01)

(52) U.S. Cl.
USPC ............ 384/477; 384/486; 277/572; 277/574

(58) Field of Classification Search
USPC ......... 384/457, 477, 484, 485, 486, 537, 517, 384/563; 29/898.07, 898.11, 898.12, 29/898.13; 123/195 R; 277/549, 551, 572, 277/573, 574
See application file for complete search history.

(56) References Cited

U.S. PATENT DOCUMENTS

| | | | | |
|---|---|---|---|---|
| 2,283,839 A | * | 5/1942 | Wright | 384/536 |
| 4,434,756 A | * | 3/1984 | Nilsson et al. | 123/195 R |
| 4,512,672 A | * | 4/1985 | Olschewski et al. | 384/477 |
| H749 H | * | 3/1990 | Nagashima | 277/568 |
| 4,949,981 A | * | 8/1990 | Nagashima | 277/573 |
| 4,958,602 A | | 9/1990 | Hoppner | |
| 4,974,973 A | | 12/1990 | Janeke | |
| 5,368,397 A | * | 11/1994 | Freiwald | 384/130 |
| 5,609,422 A | * | 3/1997 | Mueller et al. | 384/278 |
| 5,983,846 A | * | 11/1999 | Klopfer | 123/73 PP |
| 6,056,445 A | * | 5/2000 | Ueno et al. | 384/492 |
| 6,105,968 A | * | 8/2000 | Yeh et al. | 277/399 |

(Continued)

FOREIGN PATENT DOCUMENTS

WO 9745649 A1 12/1997

OTHER PUBLICATIONS

International Search Report; WO1997045649; Sep. 1, 1997.

(Continued)

*Primary Examiner* — Richard W Ridley
*Assistant Examiner* — Adam D Rogers
(74) *Attorney, Agent, or Firm* — Novak Druce Connolly + Quigg LLP

(57) ABSTRACT

The present disclosure refers to a crankshaft bearing arrangement for an internal combustion engine. The bearing arrangement comprises: a bearing arranged at a crankshaft of an internal combustion engine; a bearing seat for housing the bearing; and a sealing arrangement for sealing against the crankshaft and the bearing seat. The at least one part of the bearing seat has a reinforcement arranged in the bearing seat, and a surface of the at least one part of the bearing seat, which surface bears against the bearing, is made from a plastic material.

17 Claims, 2 Drawing Sheets

(56) References Cited

U.S. PATENT DOCUMENTS

| | | | |
|---|---|---|---|
| 6,131,543 A * | 10/2000 | Achenbach et al. | 123/195 C |
| 6,363,618 B1 * | 4/2002 | Durr | 30/381 |
| 6,647,945 B2 * | 11/2003 | Harima | 123/195 R |
| 7,011,452 B2 * | 3/2006 | Suzuki et al. | 384/486 |
| 7,114,481 B2 * | 10/2006 | Takahashi et al. | 123/195 R |
| 7,513,691 B2 * | 4/2009 | Beck | 384/513 |
| 8,186,326 B2 * | 5/2012 | Sugishita | 123/195 R |
| 2004/0119244 A1 * | 6/2004 | Duke et al. | 277/549 |
| 2008/0292231 A1 * | 11/2008 | Matsui | 384/486 |

OTHER PUBLICATIONS

International Preliminary Report on Patentability for International Application No. PCT/SE2006/001386 dated Jun. 10, 2009; 5 pages.

Written Opinion of the International Searching Authority for International Application No. PCT/SE2006/001386 dated Jul. 25, 2007; 4 pages.

* cited by examiner

CRANKSHAFT BEARING ARRANGEMENT OF A COMBUSTION ENGINE

TECHNICAL FIELD

The present disclosure relates to a crankshaft bearing arrangement of a combustion engine, and, more specifically, to a crankshaft bearing arrangement of an internal combustion engine of a hand-held motor-driven tool.

BACKGROUND

In the development of combustion engines for motor-driven tools, such as chainsaws, hedge trimmers, grass trimmers etc., bearing sleeves have been used to eliminate the need for after-treatment of bearing seats of crankshaft bearings after the bearings seats have been manufactured.

In U.S. Pat. No. 4,974,973 and WO97/45649, crankshaft bearing arrangements have been described using such bearing sleeves. In the bearing arrangement of, for example, U.S. Pat. No. 4,974,973, a bearing can be arranged in a bearing sleeve, which is formed as a tin cup with a rubber coated outer periphery. The rubber coated outer periphery is arranged to compensate for tolerances, e.g. size variations in the production of bearing seats and to seal against the cylinder and the crankcase. Also, the arrangement has an internal periphery provided with a sealing ring to seal against the crankshaft.

Even if such arrangements have a lot of advantages, some exemplary problems may occur as follows:

Due to the rather large tolerances in such an arrangement, there is a risk that the bearing is either too loosely arranged in the sleeve, with a result that the bearing may rotate in the bearing sleeve or that the bearing including the bearing sleeve will rotate in the bearing seat, or that the bearing will press too hard in the sleeve, risking obliqueness of the bearing or that the bearing and/or the bearing sleeve is squeezed in the bearing seat such that the bearing and/or the bearing sleeve finally breaks.

Even if dimensions are achieved for which a proper squeezing of the bearing and the bearing sleeve is achieved, it may be difficult to seal such an arrangement. As a result, it may be necessary to seal during operation with a substantial amount of silicone glue between the bearing seat and bearing sleeve.

Also, such a solution is rather expensive to produce, since an expensive kind of rubber is usually used for the rubber-coated outer periphery.

SUMMARY

An object of the present disclosure is to create an improved crankshaft bearing arrangement which solves the above-mentioned problems.

This is solved by a crankshaft bearing arrangement disclosed herein.

According to a first embodiment, a crankshaft bearing arrangement is arranged such that at least one part of the bearing seat has a reinforcement arranged in the bearing seat, and a surface of the at least one part of the bearing seat, which bears against the bearing, is made of a plastic material. The bearing arrangement also has a sealing arrangement for sealing against the crankshaft and bearing seat.

By having such a reinforcement, it would be possible to use a plastic material for the surface of the bearing seat without risking a compression set in the plastic material. Another advantage compared to the prior art solutions using a tin cup as a bearing sleeve, is that such a bearing sleeve can be omitted in this solution, resulting in smaller tolerances between bearing seat and bearing, i.e., manufacturing size variations. Still, existing construction tolerances can be received by the nature of the plastic material. Also, the plastic material can be produced without after-treatment with a low tolerance compared to, e.g., a metallic material. Therefore, with the arrangement according to the embodiment, there is low risk that the bearing is too loosely held in the bearing seat, such that it may rotate or is too hardly held and is tilted or damaged in any other way. Since the position between the bearing is well defined, a proper function of the crankshaft assembly including piston rod, and good cooperation of crankshaft assembly and cylinder is ensured, which will result in good engine characteristics and low emissions.

Another advantage with this arrangement is that the diameter of the bearing arrangement can be reduced since there is no bearing sleeve, which results in a more cost-effective arrangement. Also, when there is no bearing sleeve, the arrangement will be lighter and more cost-effective.

By arranging the surface of plastic material as a layer between the bearing and the reinforcement, the arrangement will be more resistant to loads, i.e., it may be exposed to rather high loads without risking a compression set in the plastic material. This is especially true if the plastic material is a fibre-reinforced plastic material.

In some embodiments, a cost-efficient sealing arrangement can be used, which can be produced from simple rubber materials and still achieve a satisfactory sealing against bearing seats and crankshaft. Also, such a sealing arrangement can be produced as one unit at the time of manufacture.

By arranging the sealing arrangement such that it has at least one protrusion arranged in a pushing engagement with the bearing, tolerances in the axial direction of the crankshaft can be received by the protrusions.

By arranging the at least one protrusion of the sealing arrangement such that it bears against an outer ring of the bearing, a displacement can be achieved between an outer ring and an inner ring of the bearing. Therefore, when the bearing is realized as a ball bearing, it is ensured that the balls of the ball bearing will be in contact with both the inner and the outer ring of the bearing. Due to this measure, the bearing will achieve a long life.

By arranging a number of protrusions forming a discontinuous ring bearing against an outer ring of the bearing, the sealing arrangement will contribute to centering the bearing in an axial direction of the crankshaft.

By arranging the at least one protrusion with a tapered shape, a compression that is proportional to the pressure from the bearing will be achieved. Therefore, dimension variations in an axial direction due to manufacturing tolerances can be well received independent of the size of the dimension variations.

According to a second aspect of the disclosure, an internal combustion engine is provided, comprising a crankshaft and at least one arrangement according to any of the embodiments described in this document.

According to third aspect of the disclosure, a hand-held motor-driven tool is provided, comprising an internal combustion engine having a crankshaft and at least one arrangement according to any of the embodiments described in this document.

BRIEF DESCRIPTION OF THE DRAWINGS

Embodiments will in the following be described in more detail with reference to the enclosed drawings, wherein.

DESCRIPTION OF EMBODIMENTS

Figures 1, 3:
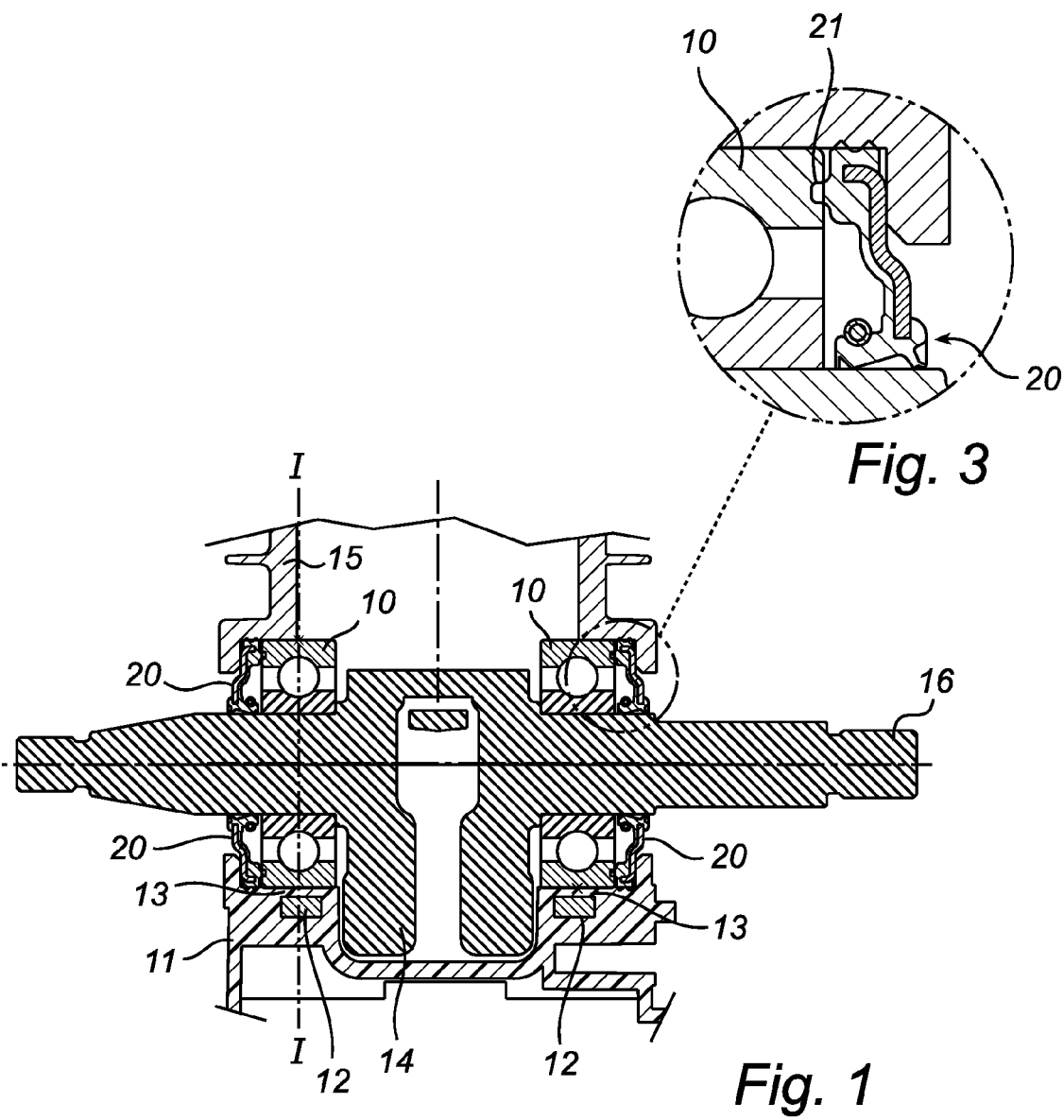
FIG. 1 illustrates an embodiment of a crankshaft bearing arrangement in a vertical cross-sectional view in an axial plane of a crankshaft at which a bearing arrangement is arranged.
FIG. 3 illustrates an enlargement of a part of FIG. 1 describing a part of a sealing arrangement according to an embodiment.

Preferred embodiments will be described more fully hereinafter with reference to the accompanying drawings. Other embodiments are contemplated in many different forms and this disclosure should not be construed as limited to the embodiments set forth herein; rather, these embodiments are provided so that this disclosure will be thorough and complete, and will fully convey the scope of the disclosure to those skilled in the art. In the drawings, like numbers refer to like elements.

In the embodiments described in the figures, a crankshaft 16 is shown, which is journalled in two bearings 10, in the form of ball bearings. Although, other types of bearings might also be used. Between the two bearings 10, and mounted on the crankshaft is a crankshaft assembly 14 with piston rod and counterweights. The bearings 10 are inserted in a bearing seat, which in this embodiment, comprises an upper half 15, which is a lower part of a cylinder of an internal combustion engine, and a lower half 11, which is a part of a crankcase of a tool in which the arrangement is installed. Each bearing is supported by the two halves of the bearing seat in such a way that the bearing seat houses the bearings.

The lower half 11 of the bearing seat has a reinforcement 12 arranged as a layer of metal inside the bearing seat for receiving a pressure force from each bearing. The reinforcement is coated by a plastic material, which provides a surface 13 of the lower half of the bearing seat, which bears directly against the bearing. Therefore, the surface 13 of plastic material is arranged as a layer between the bearing 10 and the reinforcement layer 12. The surface 13 is of a fibre-reinforced plastic material, which can endure high loads and temperatures that may occur in a held-held motor-driven tool, such as a chainsaw. The surface is made as thin as possible for the manufacturing process. Typically, when using an injection casting procedure, the plastic surface 13 will be 1-1.5 mm. Typically, the reinforcement layer 12 has a thickness of approximately 2-6 mm, depending, for example, on the size of the engine. The surface of plastic material bearing against the bearing may be made of the same plastic material as the rest of the crankcase. Therefore, the reinforcement will be embedded in the plastic material of the crankcase, and the surface of the plastic material will be arranged as a layer between the bearing and the reinforcement. In the embodiment described in the figures, the lower half of the bearing seat 11 has two reinforcements, each arranged close to each bearing 10 as a metal layer inside the bearing seat.

Figure 2:
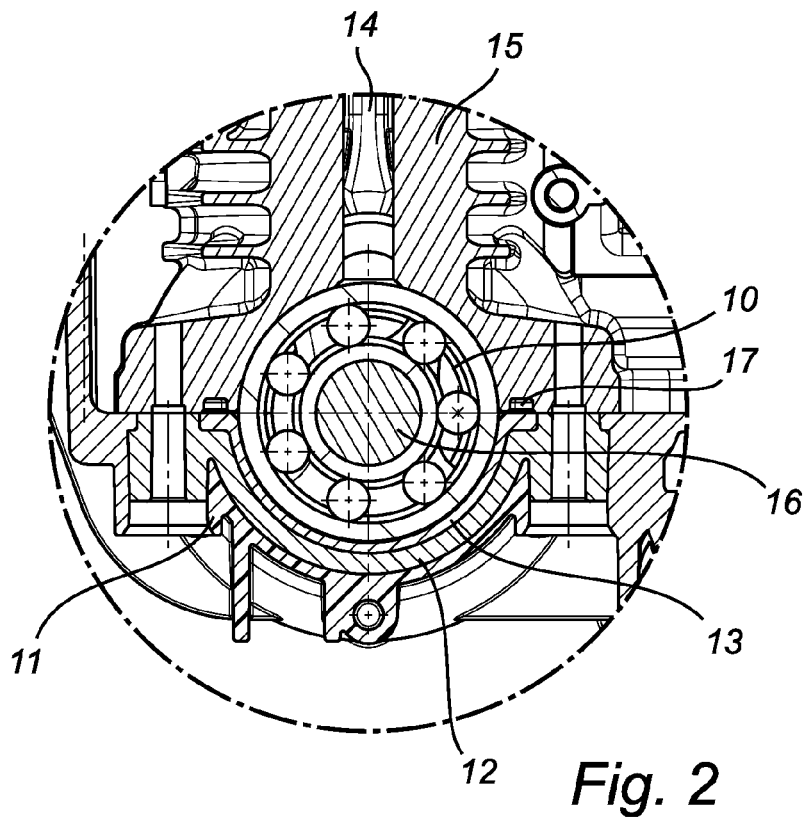
FIG. 2 illustrates an embodiment of a crankshaft bearing arrangement in a vertical cross-sectional view in section I-I of FIG. 1.

In the embodiments described in the figures, see e.g., FIG. 2, the cylinder rests on the upper part of the crankcase. For this reason, the crankcase has an upper surface comprising four metal areas 17, two at each bearing, on which the cylinder stands, called the cylinder foot plane. By arranging the plastic surface layer such that it extends to also cover the area around these four metal areas, there is no risk of leakage at the cylinder foot plane.

The embodiments described in the figures also shows two separate sealing arrangements 20, arranged against a side of each bearing 10, which faces away from the crankshaft assembly 14, both sealing arrangements being arranged around the crankshaft 16. Each sealing arrangement 20 is arranged as one unit to seal against the crankshaft 16 and the bearing seat 11, 15.

The sealing arrangement 20 shown in the embodiment described in the figures is arranged as a sealing ring having a diameter substantially equal to the diameter of the bearing 10.

Figure 4:
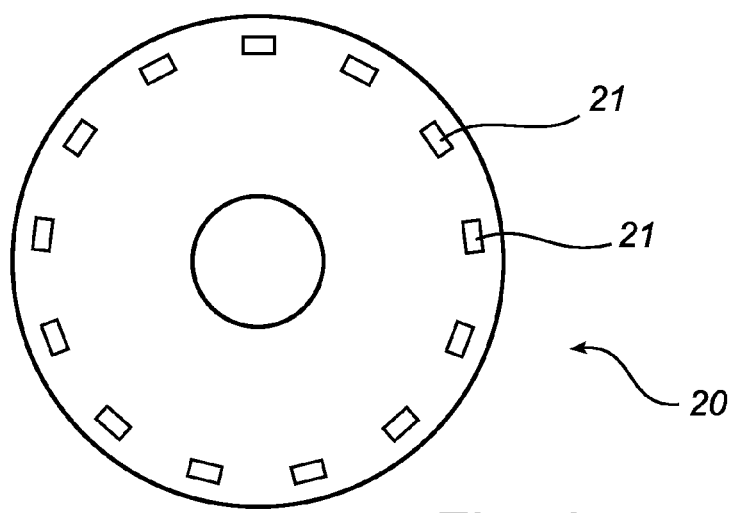
FIG. 4 illustrates a schematic front view of a side of a sealing arrangement facing the bearing, according to an embodiment.

FIG. 4 shows a side of the sealing ring which, when the sealing ring is arranged on the crankshaft, faces the bearing 10. As can be seen in FIGS. 3 and 4, the sealing ring has a number of protrusions 21 arranged at a certain radius of the ring such that the protrusions 21 bear against an outer ring of the bearing 10. Due to this measure, the protrusions 21 help to push an outer ring of the bearing 10 in an axial direction of the crankshaft 16 towards the crankshaft assembly 14, such that the bearings are pushed into a proper position, which results in a long life for the bearings, the crankshaft assembly and the cylinder. The protrusions 21 preferably form a discontinuous ring bearing against the outer ring of the bearing 10. According to other embodiments, the protrusions might also have other forms, such as a continuous ring.

The protrusions 21 preferably have a tapered shape in a direction towards the outer ring of the bearing. Although, the protrusions 21 might have other shapes, such as squared.

In the embodiment described above, the cylinder is manufactured from a metal, which means that it has a surface of metal bearing against the bearing 10. This surface has to be after-treated after the cylinder has been produced in, for example, a die casting procedure to get low tolerances and a fine surface against the bearing. Although, a cylinder of an internal combustion engine has to be after-treated anyhow, regarding other parts of a cylinder, and to make more after-treatment of a part that anyhow experiences after-treatment is more cost-efficient than to start an after-treatment process of a part that does not have to be after-treated.

In the embodiment described, only the lower half of the bearing seat has a plastic material surface bearing against the bearing and a reinforcement arranged in the bearing seat close to the surface. Although, such an arrangement might also be used for an upper part of the bearing seat, or for parts of the lower or upper part of the bearing seat.

In the embodiment described, the bearing seat comprises a lower half of a cylinder and an upper half of a crankcase, which are connected at a horizontal section. In an alternative embodiment, the crankshaft arrangements in which a bearing seat is arranged coaxially onto a crankshaft as one integral part housing one bearing. In such arrangements, the internal combustion engine comprises two bearing seats, one first bearing seat preferably housing a first bearing and one second bearing seat preferably housing a second bearing, arranged in such a way that each bearing seat supports one respective bearing. Further, in this alternative embodiment the first bearing seat is integrated in a first crankcase half and the second bearing seat is integrated in a second crankcase half, wherein the two crankcase halves are connected at a vertical section to form the crankcase. For such arrangements, the whole or part of the surface of the bearing seat may be coated with a plastic material, and correspondingly, the whole or part of the bearing seat may have a reinforcement arranged in the bearing seat. If the reinforcement is arranged in the whole of one bearing seat, it may be arranged as a ring of, e.g., metal, arranged close to the surface of plastic material. Such a ring reinforcement would be easy to manufacture and any after-treatment of a surface bearing against the bearing would be unnecessary.

The plastic material of the surface of the bearing seat bearing against the bearing is preferably any kind of reinforced plastic material, such as a carbon fibre reinforcement, a glass fibre reinforcement or a nano-composite material. The surface may be of any kind of plastic material that has a high heat distortion temperature. The higher the heat distortion temperature of the material and the thinner the layer of plastic material, the less the plastic material will be deformed.

In the drawings and specification, there have been disclosed preferred embodiments and examples, although specific terms are employed, they are used in a generic and descriptive sense only and not for the purpose of limitation, the scope of the disclosure being set forth in the following claims.

The invention claimed is:

1. A crankshaft bearing arrangement for an internal combustion engine, said bearing arrangement comprising:
   a bearing arranged on a crankshaft of the internal combustion engine;
   a bearing seat for housing the bearing, the bearing seat partially formed on a cylinder of the internal combustion engine; and
   a sealing arrangement for sealing against the crankshaft and the bearing seat;
   wherein at least one part of the bearing seat has at least one reinforcement arranged in the bearing seat, and in that a surface of the at least one part of the bearing seat, which bears against the bearing, is made from a plastic material, and the at least one reinforcement is arranged close to the respective bearing;
   wherein the sealing arrangement is arranged around the crankshaft and against a side of the bearing, which the side faces away from a crankshaft assembly, the sealing arrangement being arranged for sealing engagement with the crankshaft and the bearing seat;
   wherein the sealing arrangement has a plurality of protrusions formed on another side facing towards the crankshaft assembly in an axial direction of the crankshaft, said plurality of protrusions arranged in a pushing engagement with the bearing, for pushing the bearing in the axial direction of the crankshaft;
   wherein the bearing seat partially formed on the cylinder includes a portion that extends in a radially inward direction relative to the crankshaft and terminates a distance from the crankshaft;
   wherein the sealing arrangement is at least partially located between the portion that extends in the radially inward direction and the bearing; and
   wherein the plurality of protrusions are arranged on the sealing arrangement such that it bears against an outer ring of the bearing in the axial direction of the crankshaft.

2. The crankshaft bearing arrangement according to claim 1, wherein the surface made of the plastic material is arranged as a layer between the bearing and the at least one reinforcement.

3. The crankshaft bearing arrangement according to claim 1, wherein the at least one reinforcement is made of metal.

4. The crankshaft bearing arrangement according to claim 1, wherein the plastic material of the surface of the at least one part of the bearing seat is a fibre-reinforced plastic material capable of withstanding loads and temperatures that occur in the internal combustion engine of a hand-held motor-driven tool.

5. The crankshaft bearing arrangement according to claim 1, wherein the bearing seat comprises a lower half, and an upper half, and wherein the at least one reinforcement is arranged in the lower half.

6. The crankshaft bearing arrangement according to claim 1, wherein the bearing seat is arranged as one integral part housing the bearing, and wherein the at least one reinforcement is arranged in a whole of the bearing seat.

7. The crankshaft bearing arrangement according to claim 1, wherein the plurality of protrusions form a discontinuous ring that bears against the outer ring of the bearing.

8. An internal combustion engine comprising the crankshaft and the at least one crankshaft bearing arrangement according to claim 1.

9. The crankshaft bearing arrangement according to claim 1 wherein the crankshaft bearing arrangement is a component of a hand-held motor-driven tool.

10. A crankshaft bearing arrangement for an internal combustion engine, said bearing arrangement comprising:
    a bearing arranged on a crankshaft of the internal combustion engine;
    a bearing seat for housing the bearing, the bearing seat partially formed on a cylinder of the internal combustion engine; and
    a sealing arrangement for sealing against the crankshaft and the bearing seat;
    wherein the sealing arrangement is arranged around the crankshaft and against a side of the bearing, which the side faces away from a crankshaft assembly, the sealing arrangement being arranged for sealing engagement with the crankshaft and the bearing seat;
    wherein the sealing arrangement has a plurality of protrusions formed on an opposite side facing towards the crankshaft assembly in an axial direction of the crankshaft;
    wherein the bearing seat partially formed on the cylinder includes a portion that extends in a radially inward direction relative to the crankshaft and terminates a distance from the crankshaft;
    wherein the sealing arrangement is at least partially located between the portion that extends in the radially inward direction and the bearing; and
    wherein the plurality of protrusions are arranged on the sealing arrangement such that it bears against an outer ring of the bearing in the axial direction of the crankshaft.

11. The crankshaft bearing arrangement according to claim 10, wherein at least one part of the bearing seat has at least one reinforcement arranged in the bearing seat, and in that a surface of the at least one part of the bearing seat, which bears against the bearing, is made from a plastic material, and each of the at least one reinforcements are arranged close to the respective bearing.

12. The crankshaft bearing arrangement according to claim 11, wherein the bearing seat is arranged as one integral part housing the bearing, and wherein the at least one reinforcement is arranged in a whole of the bearing seat.

13. The crankshaft bearing arrangement according to claim 10, wherein the plurality of protrusions form a discontinuous ring that bears against the outer ring of the bearing.

14. An internal combustion engine comprising the crankshaft and the at least one crankshaft bearing arrangement according to claim 10.

15. A crankshaft bearing arrangement for an internal combustion engine, said bearing arrangement comprising:
- a bearing arranged on a crankshaft of the internal combustion engine;
- a bearing seat for housing the bearing, the bearing seat including an upper half and a lower half; and
- the upper half of the bearing seat being formed so that it only partially covers the bearing;
- a sealing arrangement for sealing against the crankshaft and the bearing seat;
- wherein the sealing arrangement is arranged around the crankshaft and against a side of the bearing, which the side faces away from a crankshaft assembly, the sealing arrangement being arranged for sealing engagement with the crankshaft and the bearing seat;
- wherein the sealing arrangement covers the bearing;
- wherein the upper half includes a portion that extends in a radially inward direction relative to the crankshaft and terminates a distance from the crankshaft;
- wherein the sealing arrangement is at least partially located between the portion that extends in the radially inward direction and the bearing; and
- wherein a plurality of protrusions are arranged on the sealing arrangement such that it bears against an outer ring of the bearing in an axial direction of the crankshaft.

16. The crankshaft bearing arrangement according to claim 15, wherein the plurality of protrusions are formed on an opposite side facing towards the crankshaft assembly in the axial direction of the crankshaft.

17. A crankshaft bearing arrangement for an internal combustion engine, said bearing arrangement comprising:
- a bearing arranged on a crankshaft of the internal combustion engine;
- a bearing seat for housing the bearing, the bearing seat partially formed on a cylinder of the internal combustion engine; and
- a sealing arrangement for sealing against the crankshaft and the bearing seat;
- wherein at least one part of the bearing seat has at least one reinforcement arranged in the bearing seat, and in that a surface of the at least one part of the bearing seat, which bears against the bearing, is made from a plastic material, and the at least one reinforcement arranged is arranged close to the respective bearing;
- wherein the sealing arrangement is arranged around the crankshaft and against a side of the bearing, which the side faces away from a crankshaft assembly, the sealing arrangement being arranged for sealing engagement with the crankshaft and the bearing seat;
- wherein the sealing arrangement has at least one protrusion formed on another side facing towards the crankshaft assembly in an axial direction of the crankshaft, said at least one protrusion arranged in a pushing engagement with the bearing, for pushing the bearing in the axial direction of the crankshaft;
- wherein the bearing seat partially formed on the cylinder includes a portion that extends in a radially inward direction relative to the crankshaft and terminates a distance from the crankshaft;
- wherein the sealing arrangement is at least partially located between the portion that extends in the radially inward direction and the bearing; and
- wherein the at least one protrusion is arranged on the sealing arrangement such that it bears against an outer ring of the bearing in the axial direction of the crankshaft.

\* \* \* \* \*